United States Patent
Anderson et al.

(10) Patent No.: US 10,408,324 B2
(45) Date of Patent: Sep. 10, 2019

(54) HYBRID COMPOSITE AND METALLIC GEAR WITH INTERLOCKING INTERFACE

(71) Applicant: Bell Helicopter Textron Inc., Fort Worth, TX (US)

(72) Inventors: Cody Clark Anderson, Fort Worth, TX (US); Gilbert Morales, Fort Worth, TX (US); Paul K. Oldroyd, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 116 days.

(21) Appl. No.: 15/676,521

(22) Filed: Aug. 14, 2017

(65) Prior Publication Data

US 2019/0048984 A1    Feb. 14, 2019

(51) Int. Cl.
*F16H 55/06*      (2006.01)
*F16H 55/12*      (2006.01)
(Continued)

(52) U.S. Cl.
CPC ............. *F16H 55/12* (2013.01); *F16H 55/06* (2013.01); *F16H 55/17* (2013.01); *F16H 57/0025* (2013.01)

(58) Field of Classification Search
CPC .......... F16H 55/12; F16H 55/17; F16H 55/06; F16H 57/0025
(Continued)

(56) References Cited

U.S. PATENT DOCUMENTS

| 103,398 | A | * | 5/1870 | Ward | F16H 55/12 |
| | | | | | 74/447 |
| 322,611 | A | * | 7/1885 | Jones | A63C 17/22 |
| | | | | | 301/5.309 |

(Continued)

FOREIGN PATENT DOCUMENTS

| DE | 102010006595 A1 * | 8/2011 | ............ B23P 11/025 |
| WO | WO-9427066 A1 * | 11/1994 | ......... F16H 57/0031 |
| WO | WO-2006015482 A1 * | 2/2006 | ............... B21K 1/30 |

OTHER PUBLICATIONS

Laberge, K.E. et al., "Performance Investigation of a Full-Scale Hybrid Composite Bull Gear," American Helicopter Society 72nd Annual Forum Proceedings, West Palm Beach, FL, May 2016.
(Continued)

*Primary Examiner* — Victor L MacArthur
*Assistant Examiner* — Gregory Robert Weber
(74) *Attorney, Agent, or Firm* — Lawrence Youst PLLC

(57) ABSTRACT

A hybrid composite and metallic gear includes a generally cylindrical shaft interface. A composite web is coupled to the shaft interface. The composite web includes a generally cylindrical rim having an outer surface. The outer surface includes a plurality of locks each having a radially outwardly extending profile. A generally cylindrical metallic gear ring having a plurality of external teeth includes an inner surface. The inner surface includes a plurality of detents each having a radially outwardly extending profile that corresponds with one of the locks of the composite web. When the composite web is positioned within the metallic (Continued)

gear ring, the corresponding locks and detents each form a lock and detent coupling establishing an interlocking interface between the composite web and the metallic gear ring.

18 Claims, 10 Drawing Sheets

(51) Int. Cl.
*F16H 55/17* (2006.01)
*F16H 57/00* (2012.01)

(58) Field of Classification Search
USPC .......................................................... 74/446
See application file for complete search history.

(56) References Cited

U.S. PATENT DOCUMENTS

| | | | | |
|---|---|---|---|---|
| 786,274 A * | 4/1905 | Duff | ........................ | F16H 55/12 29/893.2 |
| 2,707,884 A * | 5/1955 | Boisvert | ................ | F16H 55/12 74/448 |
| 3,200,665 A * | 8/1965 | Wells | ...................... | F16H 55/06 474/161 |
| 3,623,544 A * | 11/1971 | McLean | ................ | F28D 19/048 165/10 |
| 3,867,852 A * | 2/1975 | Schopf | ................ | B29C 45/1459 74/446 |
| 4,453,853 A * | 6/1984 | Cain | ........................ | F16D 1/06 403/28 |
| 6,591,708 B2 * | 7/2003 | Kobayashi | ............ | B29C 70/345 264/257 |
| 6,993,993 B2 * | 2/2006 | Konishi | .................. | F16H 55/06 74/446 |
| 2018/0172132 A1 * | 6/2018 | Kirchweger | ............ | F16H 55/12 |

OTHER PUBLICATIONS

Laberge, K.E., et al., "Hybrid Gear Performance Under Loss-of-Lubrication Conditions," American Helicopter Society 73rd Annual Forum Proceedings, Fort Worth, TX, May 2017.

* cited by examiner

HYBRID COMPOSITE AND METALLIC GEAR WITH INTERLOCKING INTERFACE

GOVERNMENT RIGHTS

At least some of the subject matter disclosed in this application may have been made with government support under Contract No. NNA15AB11B awarded by the National Aeronautics and Space Administration's Ames Research Center. The government may have certain rights in this invention.

TECHNICAL FIELD OF THE DISCLOSURE

The present disclosure relates, in general, to gears having a lightweight composite web between a metallic shaft interface and a metallic gear ring and, in particular, to a hybrid composite and metallic gear having lock and detent couplings forming an interlocking interface between the composite web and the metallic gear ring.

BACKGROUND

Components formed from composite materials, such as carbon fiber composites, have become a popular alternative to metallic components due to their high-strength and low-weight. These attributes make composite components exceptionally well suited for use in the aircraft industry where reducing weight and increasing strength are of particular importance. There are challenges, however, associated with the use of composite components. One such challenge is joining a composite component with a mating component, such as a metallic component, when forming large or complicated structures, such as airframes, rotor blades and other aircraft systems.

Two of the common joint configurations used for permanently coupling a composite component with a mating component are mechanical joints and bonded joints, each of which has relative advantages and disadvantages. Mechanical joints, such as bolted joints, provide simple and inexpensive connections between the components. It has been found, however, that bolted joints not only introduce undesirable weight to the resulting structure, but also require precision drilled holes in the composite component that may be subject to bearing wear responsive to repeated loads on the bolts. Bonded joints utilize adhesives, such as epoxies, to form the connection between the components. It has been found, however, that defects in a bonded joint may be difficult to identify and bonded joints may suffer from strength degradation responsive to tensile cyclic loading and/or exposure to high temperatures. Accordingly, a need has arisen for improved techniques for joining composite components with mating components such that the resulting structures are airworthy.

SUMMARY

In a first aspect, the present disclosure is directed to a hybrid composite and metallic gear. The hybrid composite and metallic gear includes a generally cylindrical shaft interface. A composite web is coupled to the shaft interface. The composite web includes a generally cylindrical rim having an outer surface. The outer surface includes a plurality of locks each having a radially outwardly extending profile. A generally cylindrical metallic gear ring having a plurality of external teeth includes an inner surface. The inner surface includes a plurality of detents each having a radially outwardly extending profile that corresponds with one of the locks of the composite web. When the composite web is positioned within the metallic gear ring, the corresponding locks and detents each form a lock and detent coupling establishing an interlocking interface between the composite web and the metallic gear ring.

In some embodiments, a plurality of mechanical fasteners may be used to couple the composite web to the shaft interface. In certain embodiments, the outer surface of the generally cylindrical rim of the composite web may be a lobed outer surface and the inner surface of the metallic gear ring may be a lobed inner surface that corresponds with the lobed outer surface of the composite web. In some embodiments, the locks may be uniformly distributed circumferentially about the outer surface of the generally cylindrical rim of the composite web and the detents may be uniformly distributed circumferentially about the inner surface of the metallic gear ring. In certain embodiments, the locks may be uniformly oriented about the outer surface of the generally cylindrical rim of the composite web and the detents may be uniformly oriented about the inner surface of the metallic gear ring. In other embodiments, the locks may be nonuniformly oriented about the outer surface of the generally cylindrical rim of the composite web and the detents may be nonuniformly oriented about the inner surface of the metallic gear ring. In some embodiments, the locks of the composite web may be uniformly sized and shaped and the detents of the metallic gear ring may be uniformly sized and shaped. In certain embodiments, an adhesive layer may be disposed between the outer surface of the generally cylindrical rim of the composite web and the inner surface of the metallic gear ring.

In a second aspect, the present disclosure is directed to a hybrid composite and metallic gear. The hybrid composite and metallic gear includes a generally cylindrical shaft interface. A composite web is coupled to the shaft interface. The composite web includes a generally cylindrical rim having an outer surface. The outer surface includes a plurality of detents each having a radially inwardly extending profile. A generally cylindrical metallic gear ring having a plurality of external teeth includes an inner surface. The inner surface includes a plurality of locks each having a radially inwardly extending profile that corresponds with one of the detents of the composite web. When the composite web is positioned within the metallic gear ring, the corresponding locks and detents each form a lock and detent coupling establishing an interlocking interface between the composite web and the metallic gear ring.

In some embodiments, a plurality of mechanical fasteners may be used to couple the composite web to the shaft interface. In certain embodiments, the outer surface of the generally cylindrical rim of the composite web may be a lobed outer surface and the inner surface of the metallic gear ring may be a lobed inner surface that corresponds with the lobed outer surface of the composite web. In some embodiments, the detents may be uniformly distributed circumferentially about the outer surface of the generally cylindrical rim of the composite web and the locks may be uniformly distributed circumferentially about the inner surface of the metallic gear ring. In certain embodiments, the detents may be uniformly oriented about the outer surface of the generally cylindrical rim of the composite web and the locks may be uniformly oriented about the inner surface of the metallic gear ring. In some embodiments, the detents of the composite web may be uniformly sized and shaped and the locks of the metallic gear ring may be uniformly sized and shaped. In certain embodiments, an adhesive layer may be disposed between the outer surface of the generally cylindrical rim of the composite web and the inner surface of the metallic gear ring.

In a third aspect, the present disclosure is directed to a hybrid composite and metallic gear. The hybrid composite and metallic gear includes a generally cylindrical shaft interface. A composite web is coupled to the shaft interface. The composite web includes a generally cylindrical rim having an outer surface. The outer surface includes a plurality of detents each having a radially inwardly extending profile. A generally cylindrical metallic gear ring having a plurality of external teeth includes an inner surface. The inner surface includes a plurality of detents each having a radially outwardly extending profile. A plurality of locks each has a first surface with a radially inwardly extending profile that corresponds with one of the detents of the composite web and a second surface with a radially outwardly extending profile that corresponds with one of the detents of the metallic gear ring. When the composite web is positioned within the metallic gear ring and the locks are operably positioned between the detents of the composite web and the metallic gear ring, the corresponding locks and detents each form a lock and detent coupling establishing an interlocking interface between the composite web and the metallic gear ring.

In some embodiments, a plurality of mechanical fasteners may be used to couple the composite web to the shaft interface. In certain embodiments, the outer surface of the generally cylindrical rim of the composite web may be a lobed outer surface and the inner surface of the metallic gear ring may be a lobed inner surface that corresponds with the lobed outer surface of the composite web. In some embodiments, the detents may be uniformly distributed circumferentially about the outer surface of the generally cylindrical rim of the composite web and the inner surface of the metallic gear ring. In certain embodiments, an adhesive layer may be disposed between the outer surface of the generally cylindrical rim of the composite web and the inner surface of the metallic gear ring and between the locks and the detents.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding components and in which.

DETAILED DESCRIPTION

Figure 1A:
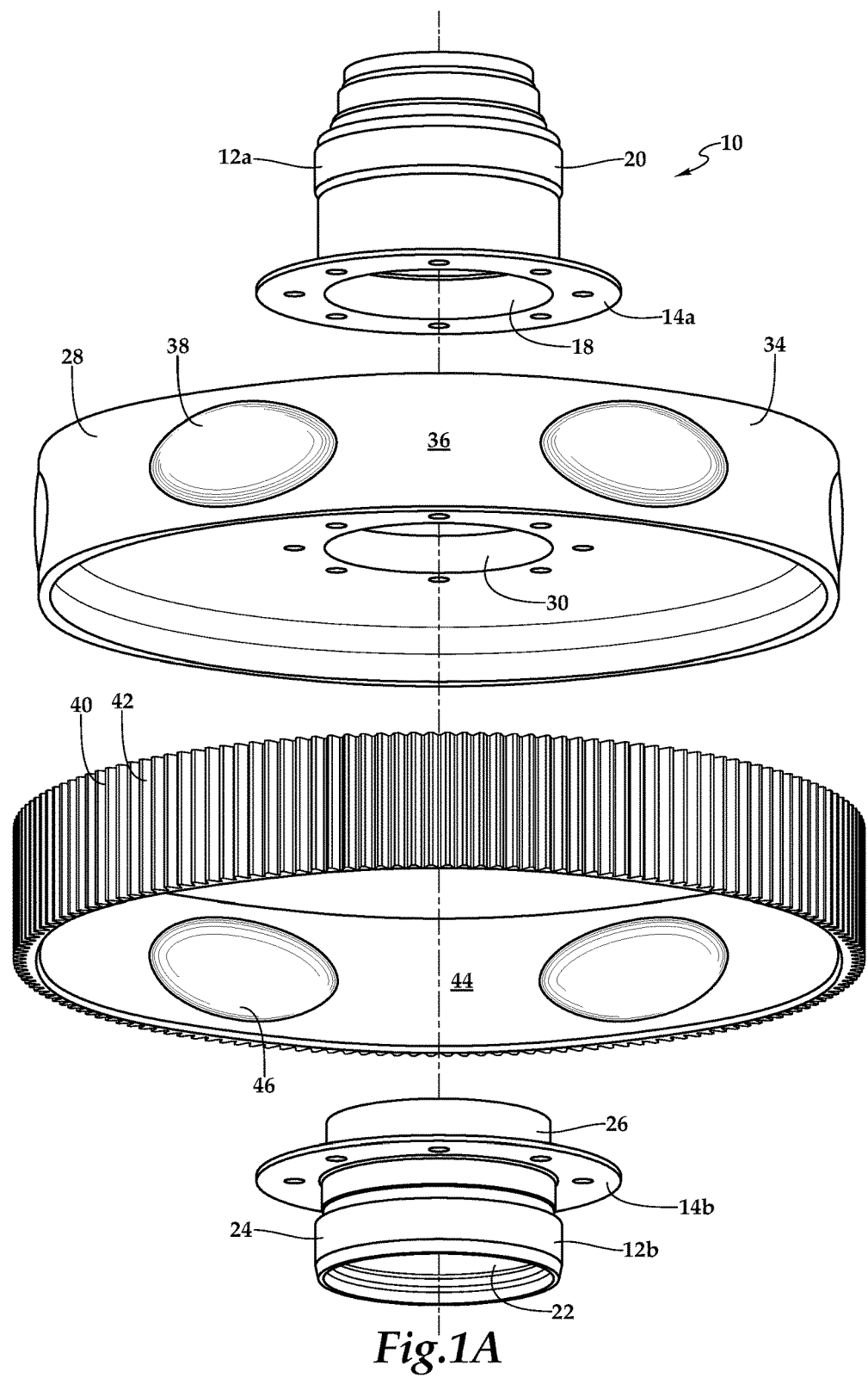
FIGS. 1A-1E are various views of a hybrid composite and metallic gear having an interlocking interface in accordance with embodiments of the present disclosure.
Figure 1B:
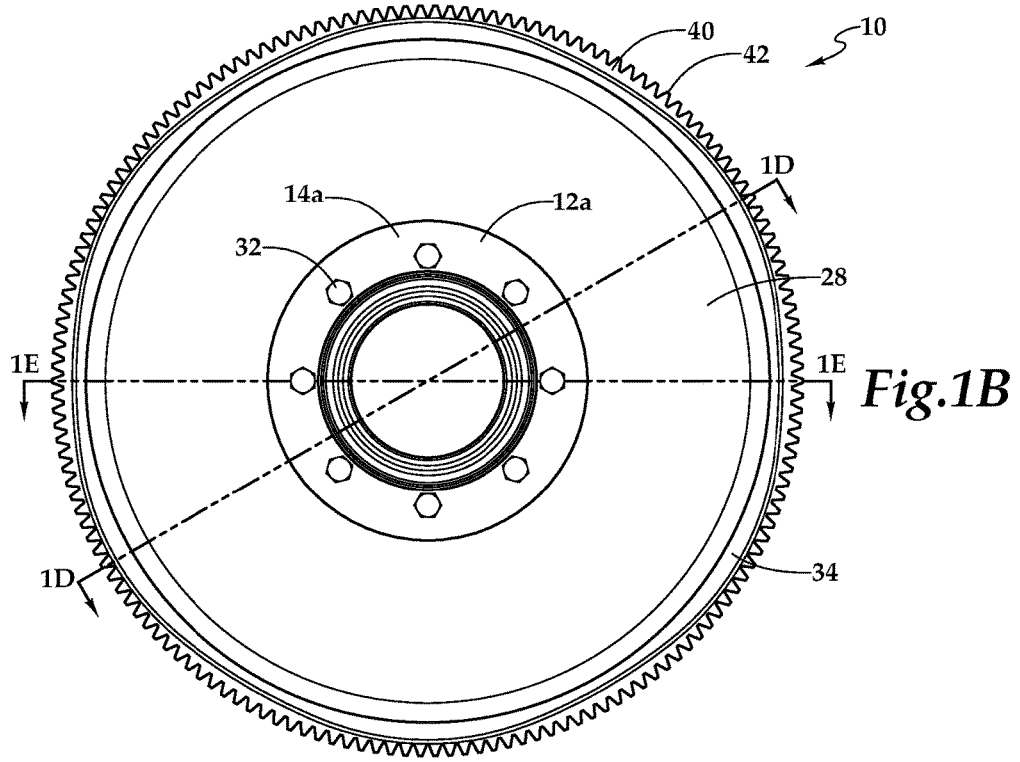
Figure 1C:
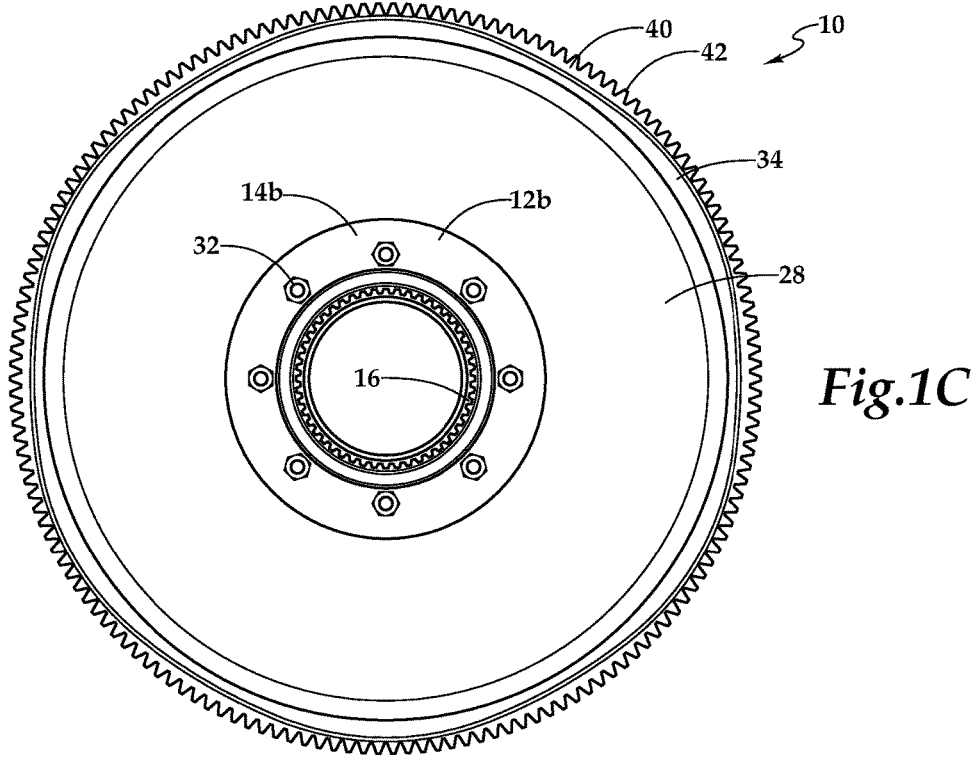
Figure 1D:
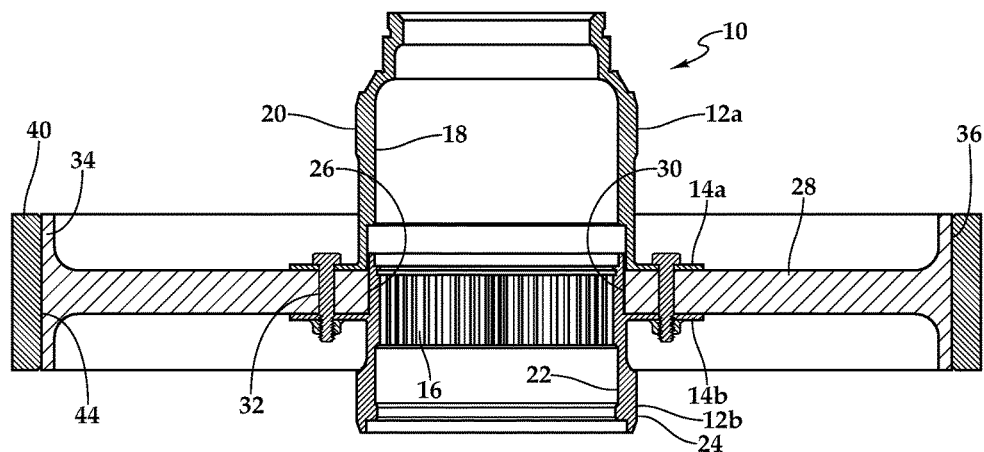

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Referring to FIGS. 1A-1E of the drawing, a hybrid composite and metallic gear having an interlocking interface is depicted and referred to herein as gear 10. In the illustrated embodiment, gear 10 includes a generally cylindrical shaft interface depicted as upper shaft interface member 12a and lower shaft interface member 12b. Upper shaft interface member 12a includes a flange 14a having a bolt pattern formed therein. Lower shaft interface member 12b includes a flange 14b having a bolt pattern formed therein that corresponds with the bolt pattern in flange 14a of upper shaft interface member 12a. Lower shaft interface member 12b includes an inner surface having splines 16 suitable for mating with a splined outer surface of a drive shaft or other suitable shaft. Upper shaft interface member 12a and lower shaft interface member 12b are considered to be generally cylindrical as each includes as least one surface, such as an inner surface or an outer surface, that is cylindrical or approximately cylindrical. For example, upper shaft interface member 12a includes an inner surface 18 having numerous cylindrical sections with step profiles therebetween and an outer surface 20 having numerous cylindrical sections with step profiles therebetween. Likewise, lower shaft interface member 12b includes an inner surface 22 having numerous cylindrical sections with step profiles therebetween and an outer surface 24 having numerous cylindrical sections with step profiles therebetween. Lower shaft interface member 12b includes an upper ring 26. Upper shaft interface member 12a and lower shaft interface member 12b may be metallic members preferably formed from steel.

Gear 10 includes a composite web 28 that may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. In one example, composite web 28 may be formed using a braided prepreg material consisting of T-700 SC carbon fibers and Tencate TC-250 resin. A 0 degree, +60 degree and −60 degree tri-axial braid architecture with equal fiber volume in all three directions may be used to provide quasi-isotropic in-plane stiffness. Preferably, composite web 28 is co-cured such that the composite layers of composite web 28 and the adhesive bond layer between composite web 28 and the mating components including metallic components are assembled and cured at the same time. The adhesive bond layer between composite web 28 and mating steel components may be a film adhesive such as Cytec MTA-241.

In the illustrated embodiment, composite web 28 includes a central opening 30, as best seen in FIG. 1A. Central opening 30 is operable to receive upper ring 26 of lower shaft interface member 12b therein. Composite web 28 also includes a bolt pattern formed therein that corresponds with the bolt patterns in flange 14a of upper shaft interface member 12a and flange 14b of lower shaft interface member 12b. In one implementation, the bolt pattern in composite web 28 or the bolt patterns in composite web 28 and flanges 14a, 14b are drilled after composite web 28, upper shaft interface member 12a and lower shaft interface member 12b are assembled and co-cured. As best seen in FIGS. 1B-1E, a plurality of mechanical fasteners depicted as bolts 32 may be used to couple upper shaft interface member 12a and lower shaft interface member 12b to composite web 28. The mechanical joint form by bolts 32 is preferably in addition to an adhesive joint form between upper shaft interface member 12a, lower shaft interface member 12b and composite web 28 in the co-cured process.

Figure 2A:
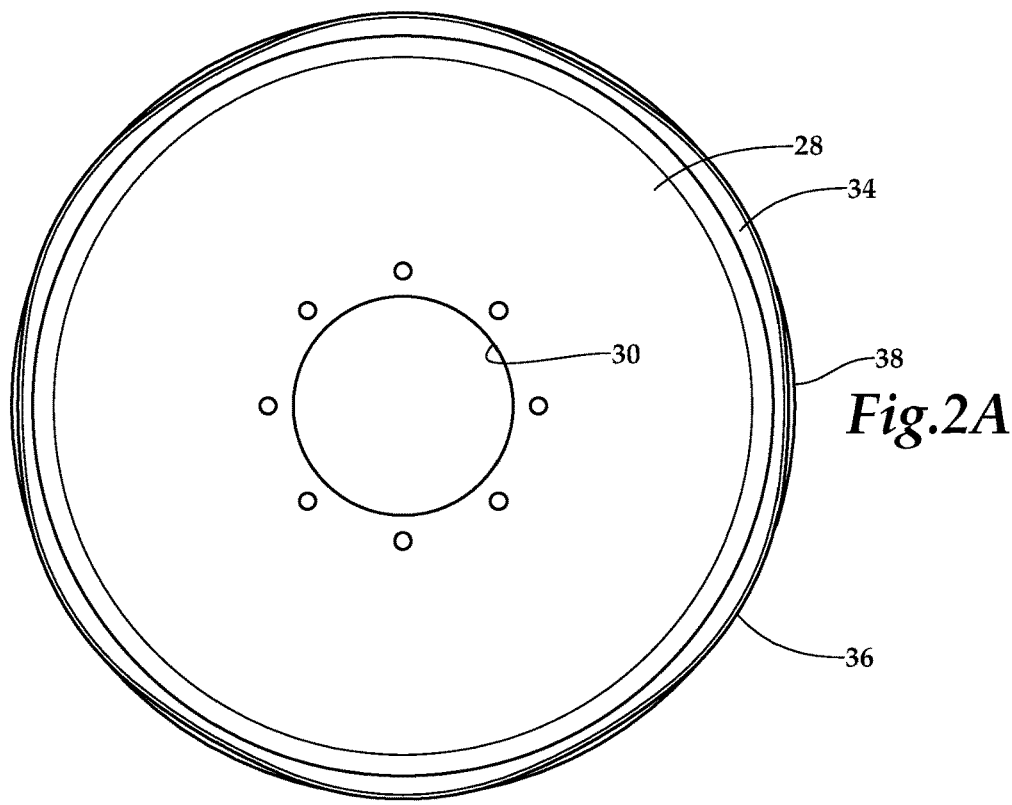
FIG. 2A is a plan view of a composite web of a hybrid composite and metallic gear having an interlocking interface in accordance with embodiments of the present disclosure.
Figure 3A:
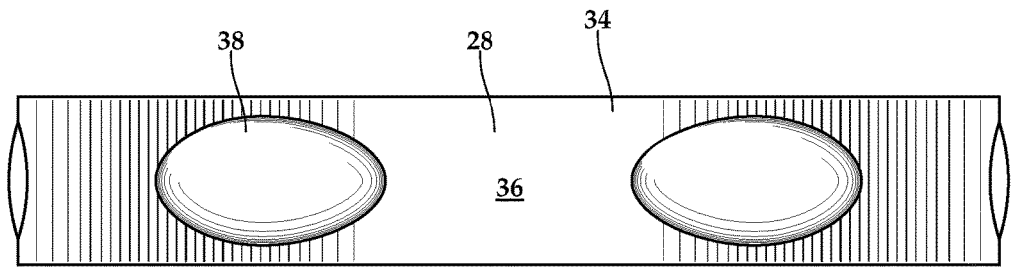
FIG. 3A is a side view of a composite web for a hybrid composite and metallic gear having an interlocking interface in accordance with embodiments of the present disclosure.

In the illustrated embodiment, composite web 28 includes a generally cylindrical rim 34. As best seen in FIG. 2A, rim 34 has an outer surface 36 that has a sinusoidal lobed pattern. In addition, outer surface 36 includes a plurality of locks 38 each having a radially outwardly extending profile, as best seen in FIGS. 1A and 3A. As used herein, the term "radially outwardly" refers to the radially increasing direction away from the central axis of gear 10 and the term "radially inwardly" refers to the radially decreasing direction toward the central axis of gear 10. As illustrated, locks 38 are integral with composite web 28 and formed from the composite material of composite web 28 during the co-cured process. In the illustrated embodiment, locks 38 are uniformly distributed at 60 degree circumferential intervals about outer surface 36 of composite web 28. In addition, locks 38 are uniformly oriented about outer surface 36 of composite web 28 as mirror images above and below a centerline about the perimeter of composite web 28. Further, each lock 38 is uniformly sized and shaped in the circumferential, longitudinal and radial directions. As illustrated, each lock 38 has a generally ellipsoid or ovoid shape.

Figure 1E:
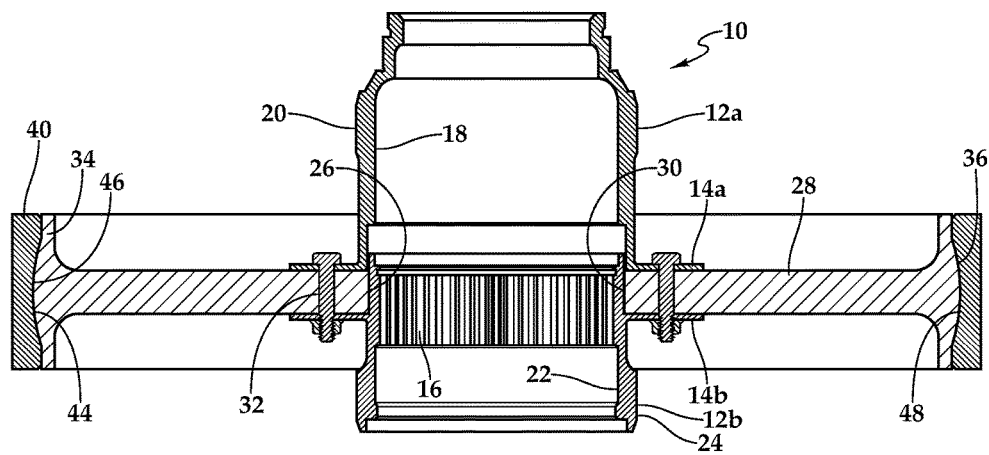
Figure 2B:
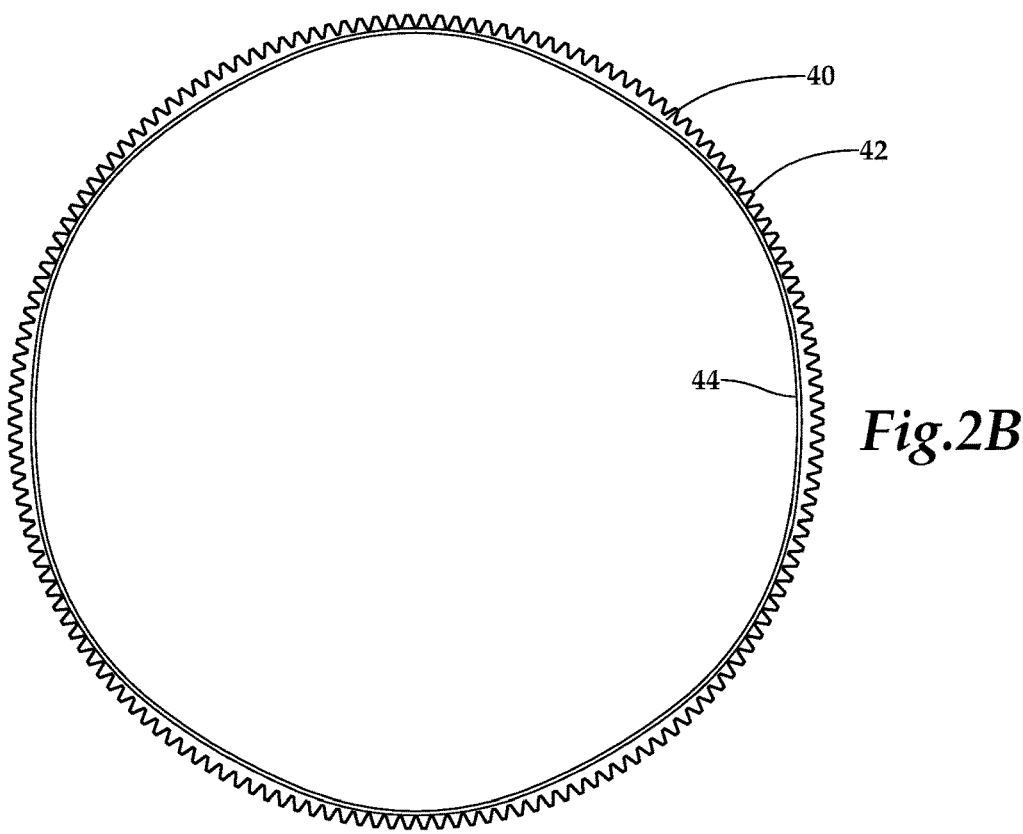
FIG. 2B is a plan view of a metallic gear ring of a hybrid composite and metallic gear having an interlocking interface in accordance with embodiments of the present disclosure.
Figure 3B:
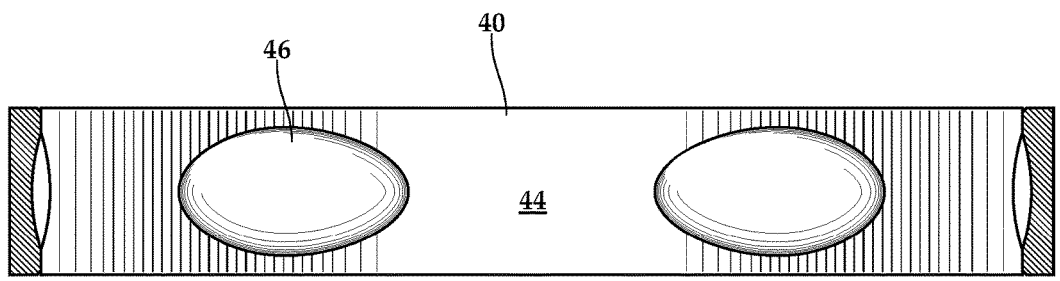
FIG. 3B is a cross sectional view of a metallic gear ring for a hybrid composite and metallic gear having an interlocking interface in accordance with embodiments of the present disclosure.
Figure 3C:
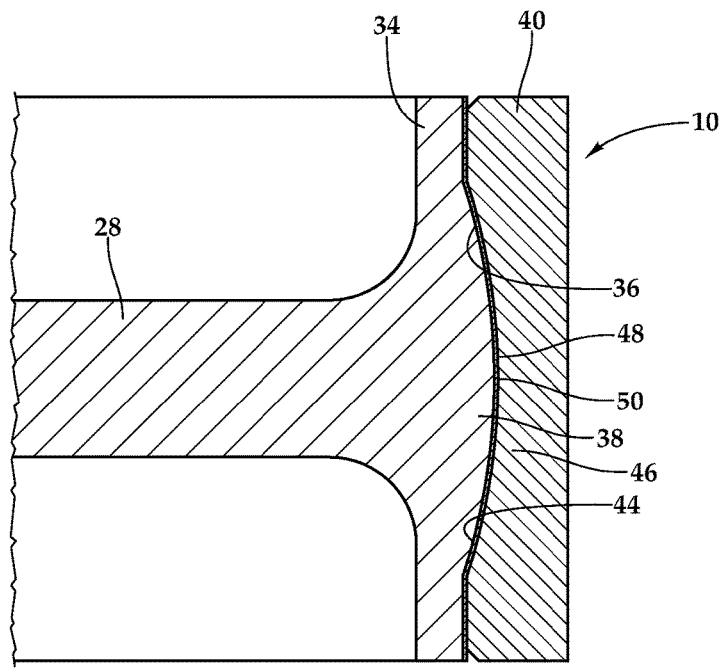
FIG. 3C is a cross sectional view of a lock and detent coupling for a hybrid composite and metallic gear having an interlocking interface in accordance with embodiments of the present disclosure.

Gear 10 includes a generally cylindrical gear ring 40 having a plurality of external teeth 42. Gear ring 40 may be a metallic member preferably formed from steel. As best seen in FIG. 2B, gear ring 40 has an inner surface 44 that has a sinusoidal lobed pattern that corresponds with the sinusoidal lobed pattern of outer surface 36 of rim 34 creating a torque interlock therebetween. In addition, inner surface 44 includes a plurality of detents 46 each having a radially outwardly extending profile, as best seen in FIGS. 1A and 3B. As illustrated, detents 46 are uniformly distributed at 60 degree circumferential intervals about inner surface 44 of gear ring 40. In addition, detents 46 are uniformly oriented about inner surface 44 of gear ring 40 as mirror images above and below a centerline about the inner perimeter of gear ring 40. Further, each detent 46 is uniformly sized and shaped in the circumferential, longitudinal and radial directions. As illustrated, each detent 46 has a generally ellipsoid or ovoid shape. Importantly, the radially outwardly extending profile of each detent 46 corresponds with one of the locks 38 of composite web 28 such that corresponding locks 38 and detents 46 each form a lock and detent coupling 48, as best seen in FIGS. 1E and 3C. Together, the lock and detent couplings 48 establish an interlocking interface between composite web 28 and gear ring 40 providing a torque interlock therebetween. The mechanical joint form by lock and detent couplings 48 is preferably in addition to an adhesive joint 50 formed between composite web 28 and gear ring 40 in the co-cured process.

Through the use of adhesive joint 50, the interlocking interface formed by lock and detent couplings 48 and the interlocking sinusoidal lobes of composite web 28 and gear ring 40, gear 10 has multiple redundant torque paths that improve the reliability and safety associated with operating a hybrid composite and metallic gear. In certain embodiments, the adhesive joint 50 may be the primary torque path between composite web 28 and gear ring 40. In the event of a partial or complete bond failure, the interlocking interface formed by lock and detent couplings 48 and/or the interlocking sinusoidal lobes of composite web 28 and gear ring 40 will provide a reliable backup preventing a catastrophic failure.

Figure 4A:
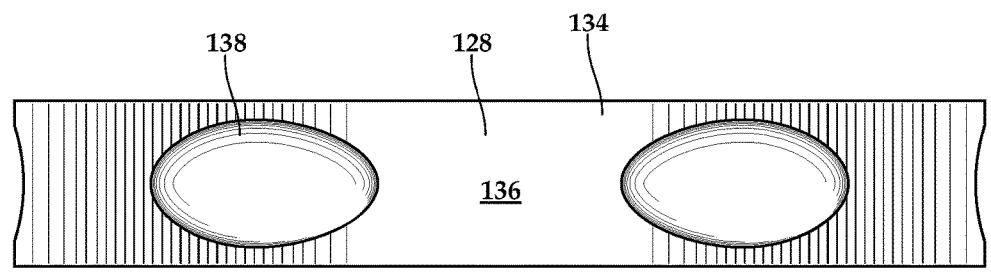
FIG. 4A is a side view of a composite web for a hybrid composite and metallic gear having an interlocking interface in accordance with embodiments of the present disclosure.
Figure 4B:
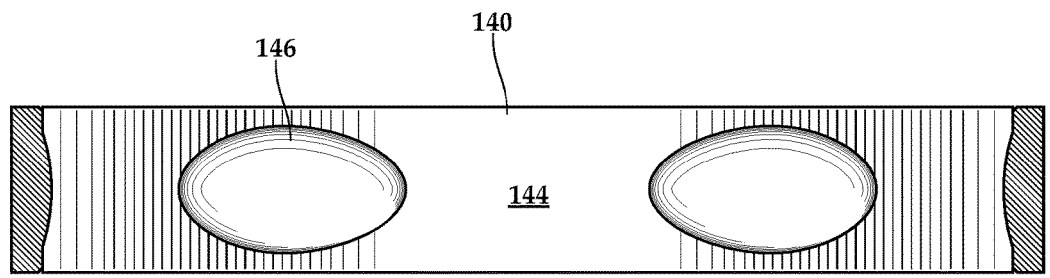
FIG. 4B is a cross sectional view of a metallic gear ring for a hybrid composite and metallic gear having an interlocking interface in accordance with embodiments of the present disclosure.
Figure 4C:
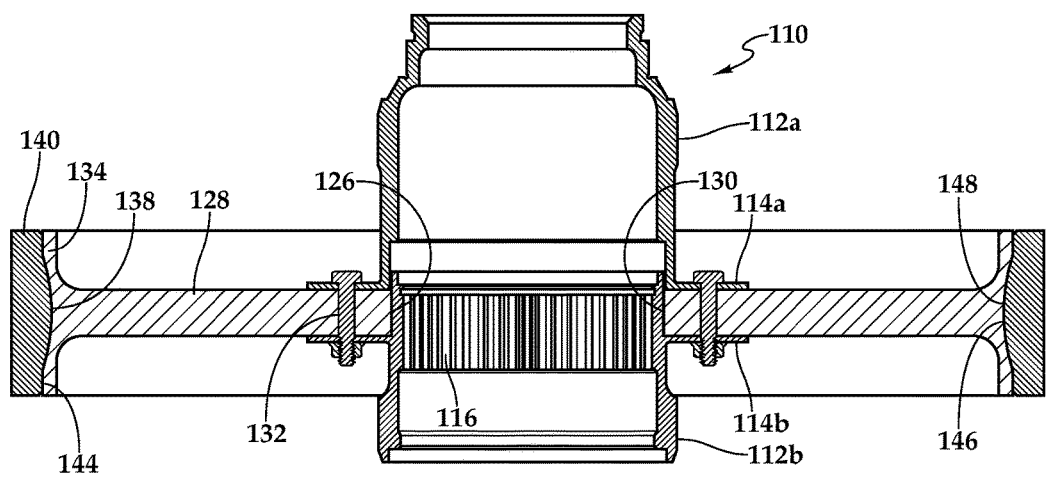
FIG. 4C is a cross sectional view of a hybrid composite and metallic gear having an interlocking interface in accordance with embodiments of the present disclosure.
Figure 5A:
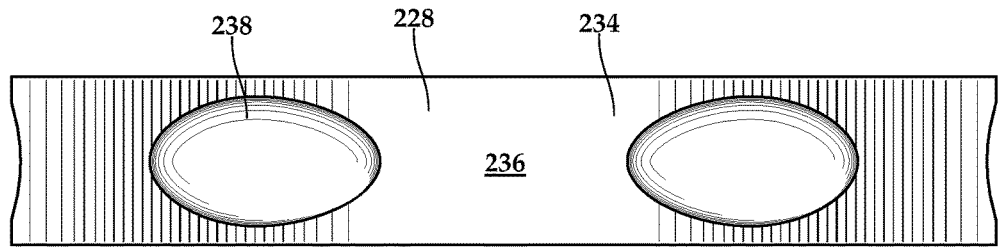
FIG. 5A is a side view of a composite web for a hybrid composite and metallic gear having an interlocking interface in accordance with embodiments of the present disclosure.
Figure 5B:
FIG. 5B is a cross sectional view of a metallic gear ring for a hybrid composite and metallic gear having an interlocking interface in accordance with embodiments of the present disclosure.
Figure 5C:
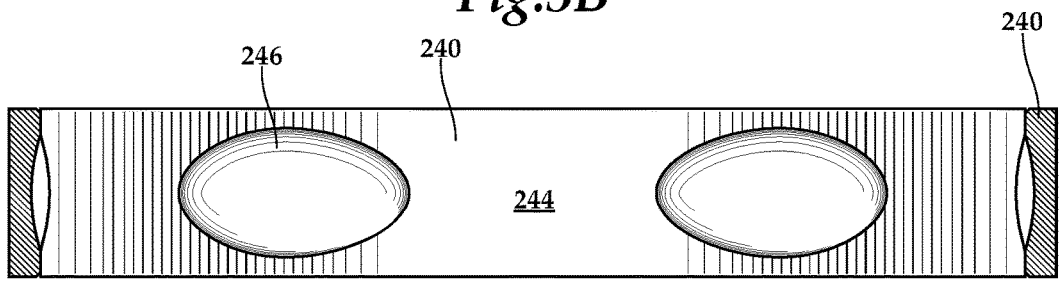
FIG. 5C depicts side and cross sectional views of locks for a hybrid composite and metallic gear having an interlocking interface in accordance with embodiments of the present disclosure.
Figure 5D:
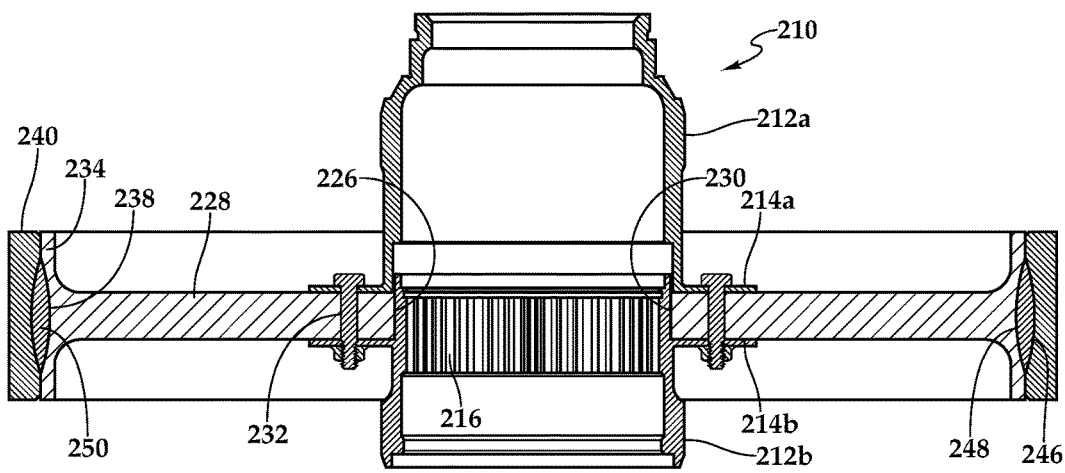
FIG. 5D is a cross sectional view of a hybrid composite and metallic gear having an interlocking interface in accordance with embodiments of the present disclosure.

Referring to FIGS. 4A-4C of the drawing, a hybrid composite and metallic gear having an interlocking interface is depicted and referred to herein as gear 110. In the illustrated embodiment, gear 110 includes a generally cylindrical shaft interface depicted as upper shaft interface member 112a and lower shaft interface member 112b. Upper shaft interface member 112a includes a flange 114a having a bolt pattern formed therein. Lower shaft interface member 112b includes a flange 114b having a bolt pattern formed therein that corresponds with the bolt pattern in flange 114a of upper shaft interface member 112a. Lower shaft interface member 112b includes an inner surface having splines 116 suitable for mating with a splined outer surface of a drive shaft or other suitable shaft. Upper shaft interface member 112a and lower shaft interface member 112b may be metallic members preferably formed from steel.

Gear 110 includes a composite web 128 that may be formed from composite materials such as those described with reference to composite web 28. In the illustrated embodiment, composite web 128 includes a central opening 130 operable to receive upper ring 126 of lower shaft interface member 112b therein. Composite web 128 also includes a bolt pattern formed therein that corresponds with the bolt patterns in flange 114a of upper shaft interface member 112a and flange 114b of lower shaft interface member 112b. A plurality of mechanical fasteners depicted as bolts 132 may be used to couple upper shaft interface member 112a and lower shaft interface member 112b to composite web 128. The mechanical joint form by bolts 132 is preferably in addition to an adhesive joint form between upper shaft interface member 112a, lower shaft interface member 112b and composite web 128 in the co-cured process.

In the illustrated embodiment, composite web 128 includes a generally cylindrical rim 134 having an outer surface 136 that has a sinusoidal lobed pattern such as that described with reference to rim 34. In addition, outer surface 136 includes a plurality of detents 138 each having a radially inwardly extending profile. In the illustrated embodiment, detents 138 are uniformly distributed at 60 degree circumferential intervals about outer surface 136 of composite web 128. In addition, detents 138 are uniformly oriented about outer surface 136 of composite web 128 as mirror images above and below a centerline about the perimeter of composite web 128. Further, each detent 138 is uniformly sized and shaped in the circumferential, longitudinal and radial directions. As illustrated, each detent 138 has a generally ellipsoid or ovoid shape.

Gear 110 includes a generally cylindrical gear ring 140 having a plurality of external teeth such as those described with reference to gear ring 40. Gear ring 140 may be a metallic member preferably formed from steel. Gear ring 140 has an inner surface 144 that has a sinusoidal lobed pattern that corresponds with the sinusoidal lobed pattern of outer surface 136 of rim 134 creating a torque interlock therebetween. In addition, inner surface 144 includes a plurality of locks 146 each having a radially inwardly extending profile. As illustrated, locks 146 are integral with gear ring 140 and are formed from the metallic material of gear ring 140. As illustrated, locks 146 are uniformly distributed at 60 degree circumferential intervals about inner surface 144 of gear ring 140. In addition, locks 146 are uniformly oriented about inner surface 144 of gear ring 140 as mirror images above and below a centerline about the inner perimeter of gear ring 140. Further, each lock 146 is uniformly sized and shaped in the circumferential, longitudinal and radial directions. As illustrated, each lock 146 has a generally ellipsoid or ovoid shape. Importantly, the radially inwardly extending profile of each lock 146 corresponds with one of the detents 138 of composite web 128 such that corresponding locks 138 and detents 146 each form a lock and detent coupling 148. Together, the lock and detent couplings 148 establish an interlocking interface between composite web 128 and gear ring 140 providing a torque interlock therebetween. The mechanical joint form by lock and detent couplings 148 is preferably in addition to an adhesive joint formed between composite web 128 and gear ring 140 in the co-cured process.

Through the use of the adhesive joint, the interlocking interface formed by lock and detent couplings 148 and the interlocking sinusoidal lobes of composite web 128 and gear ring 140, gear 110 has multiple redundant torque paths that improve the reliability and safety associated with operating a hybrid composite and metallic gear. In certain embodiments, the adhesive joint may be the primary torque path between composite web 128 and gear ring 140. In the event of a partial or complete bond failure, the interlocking interface formed by lock and detent couplings 148 and/or the interlocking sinusoidal lobes of composite web 128 and gear ring 140 will provide a reliable backup preventing a catastrophic failure.

Referring to FIGS. 5A-5D of the drawing, a hybrid composite and metallic gear having an interlocking interface is depicted and referred to herein as gear 210. In the illustrated embodiment, gear 210 includes a generally cylindrical shaft interface depicted as upper shaft interface member 212a and lower shaft interface member 212b. Upper shaft interface member 212a includes a flange 214a having a bolt pattern formed therein. Lower shaft interface member 212b includes a flange 214b having a bolt pattern formed therein that corresponds with the bolt pattern in flange 214a of upper shaft interface member 212a. Lower shaft interface member 212b includes an inner surface having splines 216 suitable for mating with a splined outer surface of a drive shaft or other suitable shaft. Upper shaft interface member 212a and lower shaft interface member 212b may be metallic members preferably formed from steel.

Gear 210 includes a composite web 228 that may be formed from composite materials such as described these with reference to composite web 28. In the illustrated embodiment, composite web 228 includes a central opening 230 operable to receive upper ring 226 of lower shaft interface member 212b therein. Composite web 228 also includes a bolt pattern formed therein that corresponds with the bolt patterns in flange 214a of upper shaft interface member 212a and flange 214b of lower shaft interface member 212b. A plurality of mechanical fasteners depicted as bolts 232 may be used to couple upper shaft interface member 212a and lower shaft interface member 212b to composite web 228. The mechanical joint form by bolts 232 is preferably in addition to an adhesive joint form between upper shaft interface member 212a, lower shaft interface member 212b and composite web 228 in the co-cured process.

In the illustrated embodiment, composite web 228 includes a generally cylindrical rim 234 having an outer surface 236 that has a sinusoidal lobed such as that described with reference to rim 34. In addition, outer surface 236 includes a plurality of detents 238 each having a radially inwardly extending profile. In the illustrated embodiment, detents 238 are uniformly distributed at 60 degree circumferential intervals about outer surface 236 of composite web 228. In addition, detents 238 are uniformly oriented about outer surface 236 of composite web 228 as mirror images above and below a centerline about the perimeter of composite web 228. Further, each detent 238 is uniformly sized and shaped in the circumferential, longitudinal and radial directions. As illustrated, each detent 238 has a generally ellipsoid or ovoid shape.

Gear 210 includes a generally cylindrical gear ring 240 having a plurality of external teeth such as those described with reference to gear ring 40. Gear ring 240 may be a metallic member preferably formed from steel. Gear ring 240 has an inner surface 244 that has a sinusoidal lobed pattern that corresponds with the sinusoidal lobed pattern of outer surface 236 of rim 234 creating a torque interlock therebetween. In addition, inner surface 244 includes a plurality of detents 246 each having a radially outwardly extending profile. As illustrated, detents 246 are uniformly distributed at 60 degree circumferential intervals about inner surface 244 of gear ring 240. In addition, detents 246 are uniformly oriented about inner surface 244 of gear ring 240 as mirror images above and below a centerline about the inner perimeter of gear ring 240. Further, each detent 246 is uniformly sized and shaped in the circumferential, longitudinal and radial directions. As illustrated, each detent 246 has a generally ellipsoid or ovoid shape.

Gear 210 includes a plurality of locks 250 each having a radially inwardly extending profile that corresponds with one of the detents 238 of composite web 228 and a radially outwardly extending profile that corresponds with one of the detents 246 of gear ring 240. Locks 250 may be formed from any suitable material including metals such as steel and composites such as those described with reference to composite web 28. Locks 250 are preferably assembled with composite web 228 and gear ring 240 using an adhesive film then co-curing the assembly to form gear 210. As the radially inwardly extending profile of each lock 250 corresponds with one of the detents 238 of composite web 128 and the radially outwardly extending profile of each lock 250 corresponds with one of the detents 246 of gear ring 240, the corresponding locks 250 and detents 238, 246 each form a lock and detent coupling 248. Together, the lock and detent couplings 248 establish an interlocking interface between composite web 228 and gear ring 240 providing a torque interlock therebetween. The mechanical joint form by lock and detent couplings 248 is preferably in addition to an adhesive joint formed between composite web 228 and gear ring 240 in the co-cured process.

Through the use of the adhesive joint, the interlocking interface formed by lock and detent couplings 248 and the interlocking sinusoidal lobes of composite web 228 and gear ring 240, gear 210 has multiple redundant torque paths that improve the reliability and safety associated with operating a hybrid composite and metallic gear. In certain embodiments, the adhesive joint may be the primary torque path between composite web 228 and gear ring 240. In the event of a partial or complete bond failure, the interlocking interface formed by lock and detent couplings 248 and/or the interlocking sinusoidal lobes of composite web 228 and gear ring 240 will provide a reliable backup preventing a catastrophic failure.

Figure 6A:
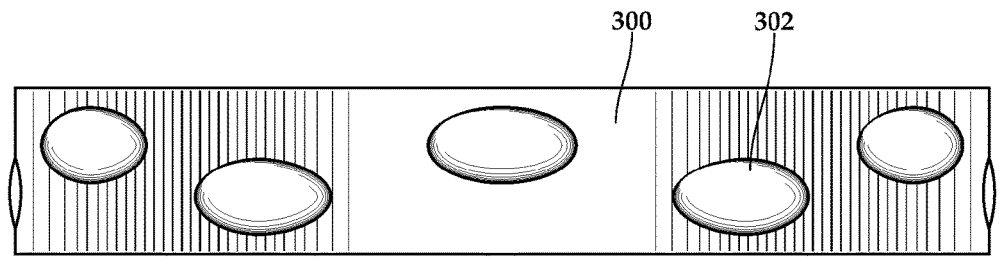
FIG. 6A is a side view of a composite web for a hybrid composite and metallic gear having an interlocking interface in accordance with embodiments of the present disclosure.
Figure 6B:
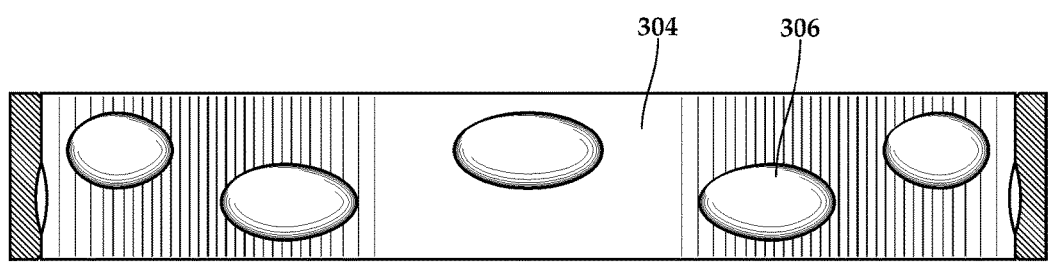
FIG. 6B is a cross sectional view of a metallic gear ring for a hybrid composite and metallic gear having an interlocking interface in accordance with embodiments of the present disclosure.
Figure 7A:
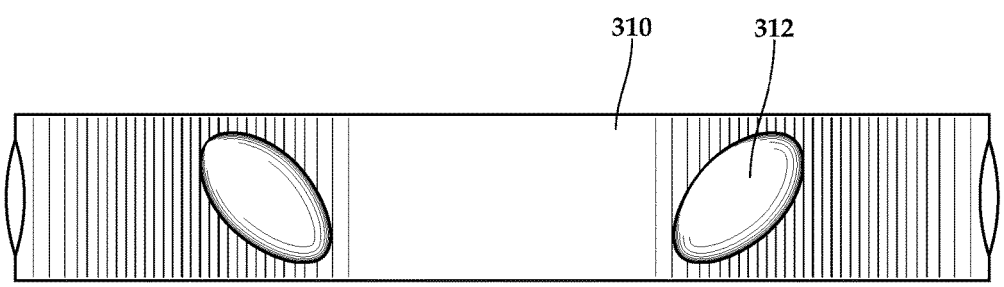
FIG. 7A is a side view of a composite web for a hybrid composite and metallic gear having an interlocking interface in accordance with embodiments of the present disclosure.
Figure 7B:
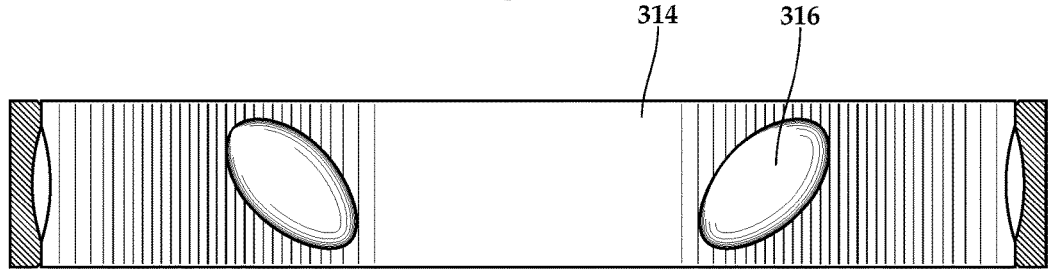
FIG. 7B is a cross sectional view of a metallic gear ring for a hybrid composite and metallic gear having an interlocking interface in accordance with embodiments of the present disclosure.
Figure 8A:
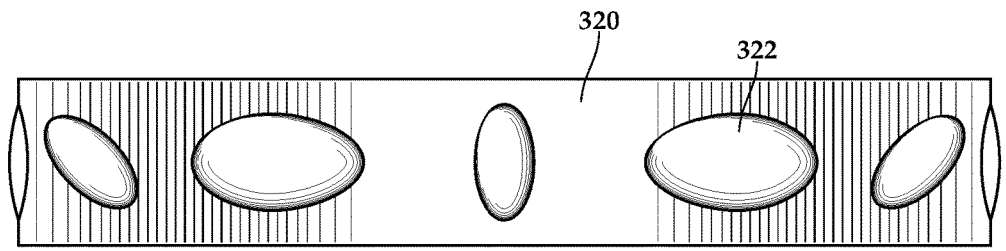
FIG. 8A is a side view of a composite web for a hybrid composite and metallic gear having an interlocking interface in accordance with embodiments of the present disclosure.
Figure 8B:
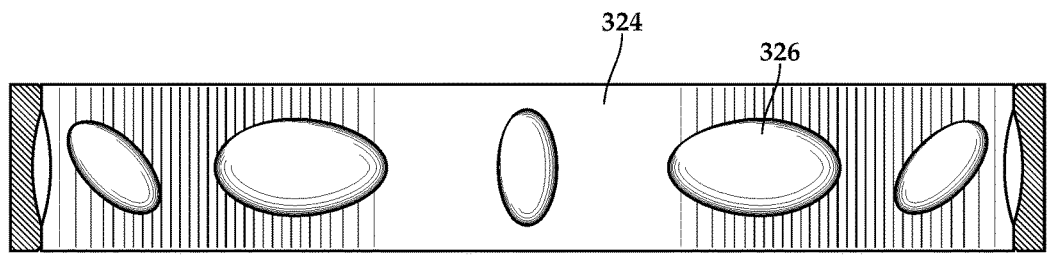
FIG. 8B is a cross sectional view of a metallic gear ring for a hybrid composite and metallic gear having an interlocking interface in accordance with embodiments of the present disclosure.

Even though the locks and detents of the composite webs and the gear rings of the present disclosure have been described and depicted as being uniformly distributed circumferentially, uniformly oriented as mirror images about a centerline, uniformly sized and uniformly shaped, it should be understood by those having ordinary skill in the art that the locks and detents of the composite webs and the gear rings of the present disclosure could have alternate designs. For example, FIGS. 6A-6B depict a composite web 300 having locks 302 and a gear ring 304 having detents 306 wherein locks 302 and detents 306 are arranged in corresponding sinusoidal patterns on composite web 300 and gear ring 304. As another example, FIGS. 7A-7B depict a composite web 310 having locks 312 and a gear ring 314 having detents 316 wherein locks 312 and detents 316 are oriented at different angles relative a centerline of composite web 310 and gear ring 314. In a further example, FIGS. 8A-8B depict a composite web 320 having locks 322 and a gear ring 324 having detents 326 wherein locks 322 and detents 326 are oriented at different angles relative a centerline, have different sizes and different shapes.

Figure 9A:
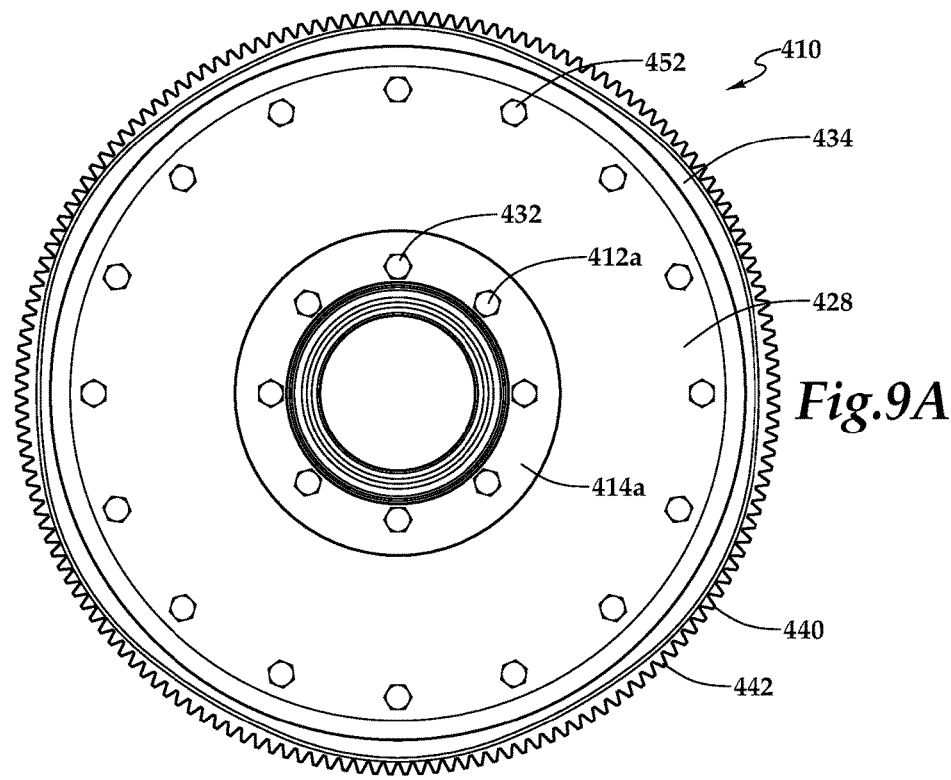
FIGS. 9A-9C are various views of a hybrid composite and metallic gear in accordance with embodiments of the present disclosure.
Figure 9B:
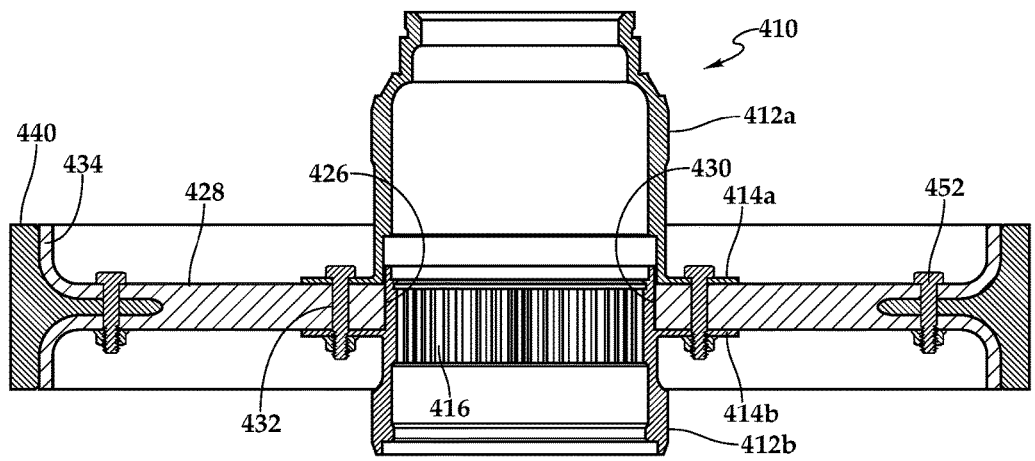
Figure 9C:
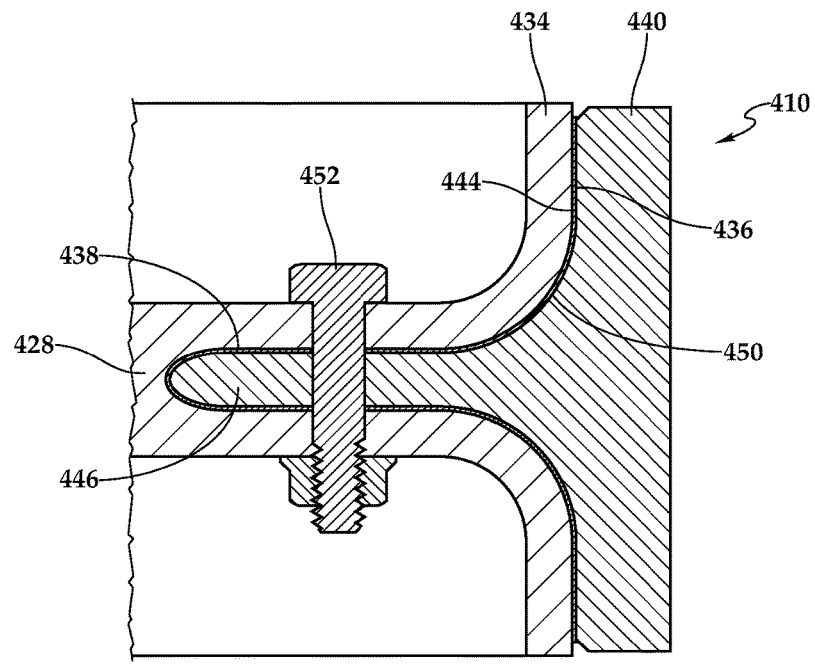

Referring to FIGS. 9A-9C of the drawing, a hybrid composite and metallic gear is depicted and referred to herein as gear 410. In the illustrated embodiment, gear 410 includes a generally cylindrical shaft interface depicted as upper shaft interface member 412a and lower shaft interface member 412b. Upper shaft interface member 412a includes a flange 414a having a bolt pattern formed therein. Lower shaft interface member 412b includes a flange 414b having a bolt pattern formed therein that corresponds with the bolt pattern in flange 414a of upper shaft interface member 412a. Lower shaft interface member 412b includes an inner surface having splines 416 suitable for mating with a splined outer surface of a drive shaft or other suitable shaft. Upper shaft interface member 412a and lower shaft interface member 412b may be metallic members preferably formed from steel.

Gear 410 includes a composite web 428 that may be formed from composite materials such as those described with reference to composite web 28. In the illustrated embodiment, composite web 428 includes a central opening 430 operable to receive upper ring 426 of lower shaft interface member 412b therein. Composite web 428 also includes a bolt pattern formed therein that corresponds with the bolt patterns in flange 414a of upper shaft interface member 412a and flange 414b of lower shaft interface member 412b. A plurality of mechanical fasteners depicted as bolts 432 may be used to couple upper shaft interface member 412a and lower shaft interface member 412b to composite web 428. The mechanical joint form by bolts 432 is preferably in addition to an adhesive joint form between upper shaft interface member 412a, lower shaft interface member 412b and composite web 428 in the co-cured process. In the illustrated embodiment, composite web 428 includes a generally cylindrical rim 434 having an outer surface 436 that has a sinusoidal lobed pattern such as that described with reference to rim 34. In addition, outer surface 436 including a radially inwardly extending annular cavity 438.

Gear 410 includes a generally cylindrical gear ring 440 having a plurality of external teeth 442. Gear ring 440 may be a metallic member preferably formed from steel. Gear ring 440 has an inner surface 444 that has a sinusoidal lobed pattern that corresponds with the sinusoidal lobed pattern of the outer surface of rim 434 creating a torque interlock therebetween. In addition, inner surface 444 including a radially inwardly extending annular flange 446. Composite web 428 is preferably assembled together with gear ring 410 including an adhesive film 450 along the mating surfaces. After co-curing the assembly, a bolt pattern may be drilled through composite web 428 including annular cavity 438 and gear ring 440 through flange 446. A plurality of mechanical fasteners depicted as bolts 452 may be used to couple gear ring 440 to composite web 428.

Through the use of the adhesive joint, the mechanical joint and the interlocking sinusoidal lobes of composite web 428 and gear ring 440, gear 410 has multiple redundant torque paths that improve the reliability and safety associated with operating a hybrid composite and metallic gear. In certain embodiments, the adhesive joint may be the primary torque path between composite web 428 and gear ring 440. In the event of a partial or complete bond failure, the mechanical joint and/or the interlocking sinusoidal lobes of composite web 428 and gear ring 440 will provide a reliable backup preventing a catastrophic failure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A hybrid composite and metallic gear comprising:
   a generally cylindrical shaft interface;
   a composite web coupled to the shaft interface, the composite web including a generally cylindrical rim having an outer surface, the outer surface including a plurality of locks each having a radially outwardly extending profile and an ellipsoid shape;
   a generally cylindrical metallic gear ring having a plurality of external teeth, the metallic gear ring having an inner surface, the inner surface including a plurality of detents each having a radially outwardly extending profile and an ellipsoid shape that correspond with one of the locks of the composite web; and
   an adhesive layer disposed between the outer surface of the generally cylindrical rim of the composite web and the inner surface of the metallic gear ring providing a first interlocking interface between the composite web and the metallic gear ring;
   wherein, the composite web is positioned within the metallic gear ring such that corresponding locks and detents each form a lock and detent coupling establishing a second interlocking interface between the composite web and the metallic gear ring.

2. The hybrid composite and metallic gear as recited in claim 1 further comprising a plurality of mechanical fasteners coupling the composite web to the shaft interface.

3. The hybrid composite and metallic gear as recited in claim 1 wherein the outer surface of the generally cylindrical rim of the composite web further comprises a lobed outer surface and wherein the inner surface of the metallic gear ring further comprises a lobed inner surface that corresponds with the lobed outer surface of the composite web.

4. The hybrid composite and metallic gear as recited in claim 1 wherein the locks are uniformly distributed circumferentially about the outer surface of the generally cylindrical rim of the composite web and wherein the detents are uniformly distributed circumferentially about the inner surface of the metallic gear ring.

5. The hybrid composite and metallic gear as recited in claim 1 wherein the locks are uniformly oriented about the outer surface as mirror images above and below a centerline of the generally cylindrical rim of the composite web and wherein the detents are uniformly oriented about the inner surface as mirror images above and below a centerline of the metallic gear ring.

6. The hybrid composite and metallic gear as recited in claim 1 wherein the locks are nonuniformly oriented about the outer surface of the generally cylindrical rim of the composite web and wherein the detents are nonuniformly oriented about the inner surface of the metallic gear ring.

7. The hybrid composite and metallic gear as recited in claim 1 wherein the locks of the composite web are uniformly sized and shaped and wherein the detents of the metallic gear ring are uniformly sized and shaped.

8. The hybrid composite and metallic gear as recited in claim 1 wherein the locks are oriented in a sinusoidal pattern about the outer surface of the generally cylindrical rim of the composite web and wherein the detents are oriented in a corresponding sinusoidal pattern about the inner surface of the metallic gear ring.

9. The hybrid composite and metallic gear as recited in claim 1 wherein the locks are oriented at multiple angles relative to a centerline of the composite web and wherein the detents are oriented at multiple angles relative to a centerline of the metallic gear ring that correspond with the multiple angles of the locks.

10. The hybrid composite and metallic gear as recited in claim 1 wherein the locks of the composite web are nonuniformly sized and shaped and wherein the detents of the metallic gear ring are nonuniformly sized and shaped.

11. A hybrid composite and metallic gear comprising:
    a generally cylindrical shaft interface;
    a composite web including a generally cylindrical rim having a lobed outer surface, the outer surface including a plurality of locks each having a radially outwardly extending profile and an ellipsoid shape;
    a plurality of mechanical fasteners coupling the composite web to the shaft interface;

a generally cylindrical metallic gear ring having a plurality of external teeth, the metallic gear ring having a lobed inner surface that corresponds with the lobed outer surface of the composite web, the inner surface including a plurality of detents each having a radially outwardly extending profile and an ellipsoid shape that correspond with one of the locks of the composite web; and an adhesive layer disposed between the outer surface of the generally cylindrical rim of the composite web and the inner surface of the metallic gear ring providing a first torque interlock therebetween;

wherein, the composite web is positioned within the metallic gear ring such that the lobed outer surface of the composite web and the lobed inner surface of the metallic gear ring form a second torque interlock therebetween; and wherein, the composite web is positioned within the metallic gear ring such that the corresponding locks and detents form a third torque interlock therebetween.

12. The hybrid composite and metallic gear as recited in claim 11 wherein the locks are uniformly distributed circumferentially about the outer surface of the generally cylindrical rim of the composite web and wherein the detents are uniformly distributed circumferentially about the inner surface of the metallic gear ring.

13. The hybrid composite and metallic gear as recited in claim 11 wherein the locks are uniformly oriented about the outer surface as mirror images above and below a centerline of the generally cylindrical rim of the composite web and wherein the detents are uniformly oriented about the inner surface as mirror images above and below a centerline of the metallic gear ring.

14. The hybrid composite and metallic gear as recited in claim 11 wherein the locks are nonuniformly oriented about the outer surface of the generally cylindrical rim of the composite web and wherein the detents are nonuniformly oriented about the inner surface of the metallic gear ring.

15. The hybrid composite and metallic gear as recited in claim 11 wherein the locks of the composite web are uniformly sized and shaped and wherein the detents of the metallic gear ring are uniformly sized and shaped.

16. The hybrid composite and metallic gear as recited in claim 11 wherein the locks are oriented in a sinusoidal pattern about the outer surface of the generally cylindrical rim of the composite web and wherein the detents are oriented in a corresponding sinusoidal pattern about the inner surface of the metallic gear ring.

17. The hybrid composite and metallic gear as recited in claim 11 wherein the locks are oriented at multiple angles relative to a centerline of the composite web and wherein the detents are oriented at multiple angles relative to a centerline of the metallic gear ring that correspond with the multiple angles of the locks.

18. The hybrid composite and metallic gear as recited in claim 11 wherein the locks of the composite web are nonuniformly sized and shaped and wherein the detents of the metallic gear ring are nonuniformly sized and shaped.

* * * * *